(12) United States Patent
Tang et al.

(10) Patent No.: US 11,610,011 B2
(45) Date of Patent: Mar. 21, 2023

(54) SECURE TRANSFER OF DATA BETWEEN PROGRAMS EXECUTING ON THE SAME END-USER DEVICE

(71) Applicant: Akamai Technologies Inc., Cambridge, MA (US)

(72) Inventors: David Tang, Revere, MA (US); Charles E. Gero, Quincy, MA (US); Cameron Ross, Malden, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 149 days.

(21) Appl. No.: 17/162,914

(22) Filed: Jan. 29, 2021

(65) Prior Publication Data

US 2022/0245264 A1 Aug. 4, 2022

(51) Int. Cl.
H04L 29/06 (2006.01)
G06F 21/60 (2013.01)
H04L 9/40 (2022.01)

(52) U.S. Cl.
CPC ........ *G06F 21/606* (2013.01); *H04L 63/0428* (2013.01); *H04L 63/12* (2013.01); *H04L 63/166* (2013.01)

(58) Field of Classification Search
CPC ... G06F 21/606; H04L 63/0428; H04L 63/12; H04L 63/166
USPC ......................................................... 713/151
See application file for complete search history.

(56) References Cited

U.S. PATENT DOCUMENTS

| | | | |
|---|---|---|---|
| 9,455,960 B2 | 9/2016 | Budhani et al. |
| 9,479,481 B2 | 10/2016 | Budhani et al. |
| 9,479,482 B2 | 10/2016 | Budhani et al. |
| 9,819,582 B2 | 11/2017 | Ellis et al. |
| 10,903,990 B1 | 1/2021 | Ladd et al. |
| 10,951,407 B2 | 3/2021 | Gill et al. |
| 11,019,034 B2 | 5/2021 | Ludin et al. |

(Continued)

OTHER PUBLICATIONS

Javascript—Can a website make an HTTP request to "localhost"? How does it get around the crossdomain policy?, downloaded on Dec. 16, 2020, with date asked 5 years 6 months prior, 3 pages. https://security.stackexchange.com/questions/92008/can-a-website-make-an-http-request-to-localhost-how-does-it-get-around-the-cr.

(Continued)

*Primary Examiner* — Jeffrey C Pwu
*Assistant Examiner* — Samuel Ambaye (57) ABSTRACT

It is often necessary to securely transfer data, such as authenticators or authorization tokens, between programs running on the same end-user device. The teachings hereof enable the pairing of two programs executing on a given end-user device and then the transfer of data from one program to the other. In an embodiment, a first program connects to a server and sends encrypted data elements. A second program intercepts the connection and/or the encrypted data elements. The second program tunnels the encrypted data elements (which remain opaque to the second program at this point) to a server, using an encapsulating protocol. This enables the server to receive the data elements sent by the first program, decrypt them, and provide them to the second program via return message using control fields of the encapsulating protocol. Once set up, the tunneling arrangement enables bidirectional data transfer.

20 Claims, 5 Drawing Sheets

(56) References Cited

U.S. PATENT DOCUMENTS

| | | | | |
|---|---|---|---|---|
| 2007/0245409 | A1* | 10/2007 | Harris | H04L 67/568 |
| | | | | 726/5 |
| 2012/0030687 | A1 | 2/2012 | Bhandiwad et al. | |
| 2015/0052348 | A1* | 2/2015 | Moskowitz | H04L 63/168 |
| | | | | 713/151 |
| 2018/0034633 | A1 | 2/2018 | Gill et al. | |
| 2019/0114216 | A1 | 4/2019 | Wu | |
| 2019/0149514 | A1 | 5/2019 | Jawahar | |
| 2019/0340376 | A1 | 11/2019 | Fleck et al. | |

OTHER PUBLICATIONS

Project Zero—Issue 1471: blizzard: agent rpc auth mechanism vulnerable to dns rebinding, dated Dec. 8, 2017, downloaded on Dec. 16, 2020, 2 pages. https://bugs.chromium.org/p/project-zero/issues/detail?id=1471&desc=3.

Apibot, , "How to test an API running on localhost from outside localhost?", Sep. 17, 2017, downloaded on Dec. 16, 2020, 4 pages. https://medium.com/@The_Real_Apibot/testing-an-api-from-a-local-server-on-the-internet-3d59333e15cc.

Benyovski, J. "Using Websockets with the Webex JavaScript SDK, Sep. 26, 2019, 7 pages.", https://developer.webex.com/blog/using-websockets-with-the-webex-javascript-sdk.

Duckett, C., "Zoom defends use of local web server on Macs after security report, dated Jul. 9, 2019, downloaded on Dec. 16, 2020, 4 pages.", https://www.zdnet.com/article/zoom-defends-use-of-local-web-server-on-macs-after-security-report/.

Leitschuh, J., "Zoom Zero Day: 4+ Million Webcams & maybe an RCE? Just get them to visit your website!", Jul. 8, 2019, 15 pages. https://medium.com/bugbountywriteup/zoom-zero-day-4-million-webcams-maybe-an-rce-just-get-them-to-visit-your-website-ac75c83f4ef5.

Paganini, P., "Google hacker found a critical flaw in Blizzard Games that expose millions of PCs to DNS Rebinding attacks", Jan. 23, 2018, downloaded on Dec. 16, 2020, 3 pages. https://securityaffairs.co/wordpress/68097/hacking/blizzard-games-dns-rebinding.html.

Extended European Search Report for European Application No. 22153279.9, counterpart to current case, dated Jun. 21, 2022, 6 pages.

* cited by examiner

SECURE TRANSFER OF DATA BETWEEN PROGRAMS EXECUTING ON THE SAME END-USER DEVICE

BACKGROUND

Technical Field

This patent document generally relates to information security, networking, and computer hardware and software.

Brief Description of the Related Art

Software and software-as-a-service vendors may sometimes need to transfer authenticators, session state, or other data between two software programs running on the same end-user device. For example, a website delivered in a browser may need to send data (such as tokens from the results authentication and/or authorization processes) to another client program running on that same device. To accomplish this, it is well known in the art by others to have that client program run an API server listening on localhost and have the website make HTTP requests to http[s]://localhost/ . . . via an AJAX call (for example). This "agent over localhost" method works, but brings with it a lot of interoperability and security issues. This method can lead to cross origin resources sharing (CORS) violations, the use of cleartext traffic (if HTTP with TLS cannot be used), and certificate management issues (if using HTTPS), and other problems. Some anti-virus software flags this method as malicious activity and many browsers restrict or warn about this type of traffic.

This patent document addresses the need for improved systems and methods for transferring data between two software programs executing on the same device. The teachings hereof can be used to improve the security of data transfers: they also simplify and make more efficient such transfers insofar as they are used to mitigate the potential problems identified above. They can be used in a wide variety of ways, including, without limitation, to securely bind authenticators from rich HTTPS based interactions with a user's web browser to another piece of software on the end-user device, such as a VPN or VPN-substitute access client, which may be used to tunnel connections to enterprise resources over the public Internet. More details about such a use case can be found in U.S. Pat. Nos. 9,455,960, 9,479,482, 9,479,481, and 9,491,145 the teachings of all of which are hereby incorporated by reference in their entirety.

Accordingly, the teachings presented herein improve the functioning of a computer system itself. Those skilled in the art will understand these and other improvements from the teachings hereof.

BRIEF SUMMARY

This section describes some pertinent aspects of this invention. It is illustrative, not exhaustive, and not a definition of the invention. The claims of any issued patent define the scope of protection. The claims are incorporated by reference into this section, in their entirety.

It is often necessary to transfer data (such as authenticators, authorization tokens, other session state information) from one program to another running on the same end-user device. Known methods of doing so are problematic and often insecure. The teachings hereof enable the secure pairing of two programs running on a given user device, with a proof that they are co-located, and then the transfer of data from one to the other. In some embodiments, after pairing, a first program that needs to transfer data establishes a connection with a server and sends encrypted data elements to it. A second program intercepts the connection and/or encrypted data elements, preferably based on the identity of the server to which the outbound connection is addressed. The second program tunnels the encrypted data elements (which remain opaque to the second program at this point) to the server, using an encapsulating protocol. This enables the server to receive the encapsulating tunnel from the second program, decapsulate it, and then gain access to the encrypted elements of the first program within. The encapsulating tunnel and associated control messages and fields provide a communication channel with the second program, while the protocol and the data within the tunnel provide for a communication channel with the first program. The server can then choose to share information from one channel to the other, at its discretion and policies, to enable transfer of information safely.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this patent document and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. Likewise, basic familiarity with well-known database technologies and terms, such as relational databases (RDBMS), SQL databases and queries, NoSQL databases and/or key-value approaches, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Figure 1A:
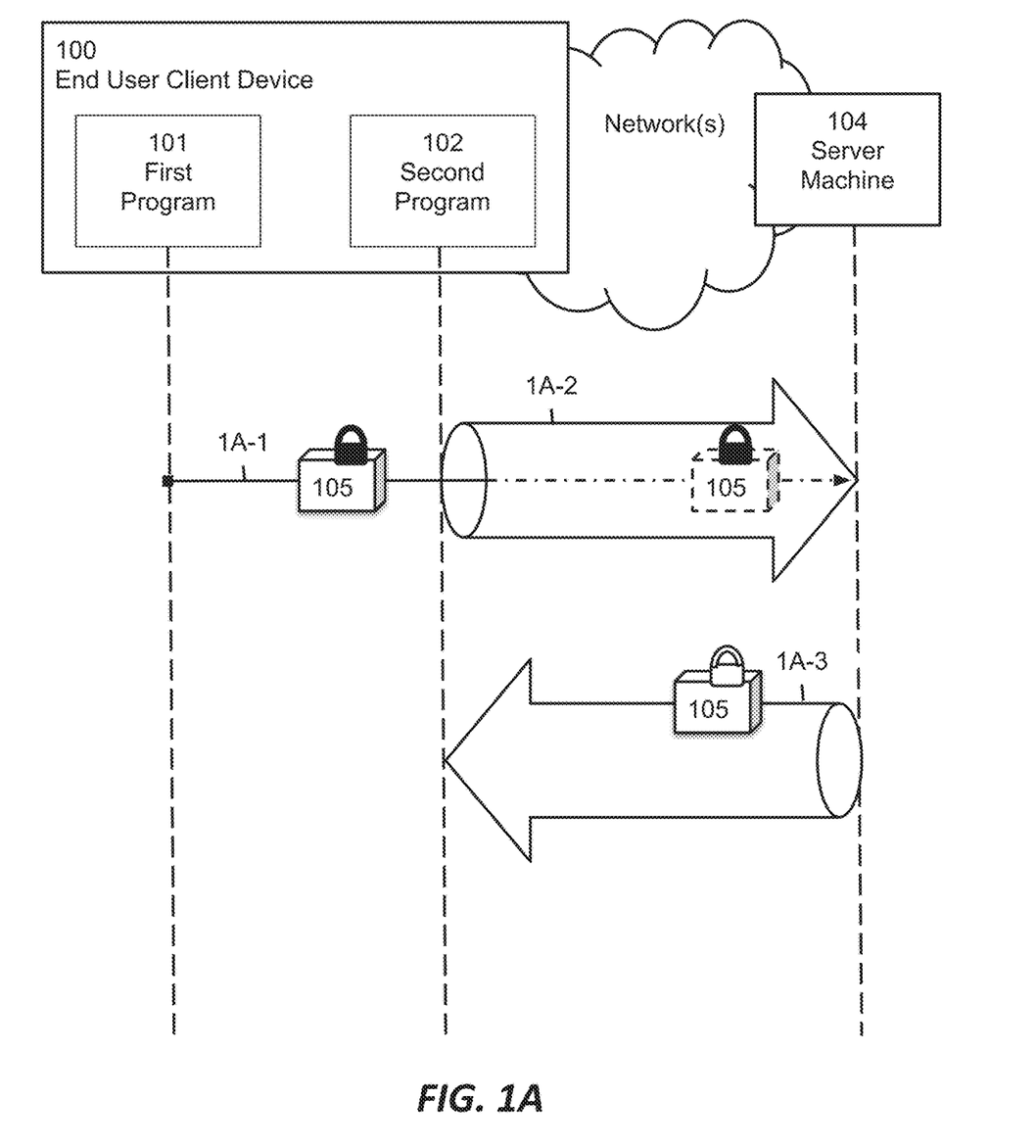
FIG. 1A is a diagram illustrating a data transfer process between first and second programs on an end user device, in accordance with one embodiment of the teachings hereof.

FIG. 1A illustrates a data transfer operation in accord with one embodiment of the invention. It focuses on the interactions amongst an end-user device 100, which has both a first program 101 and second program 102 executing thereon, and a server machine 104 executing one or more server-side programs. The server machine 104 is sometimes referred to herein simply as the server 104.

The first program 101 is typically (though without limitation) a user-space application, such as a web browser, from which authenticators or other data elements 105 will be gathered. The second application 102 can be another application, daemon, operating system module, or other program executing on the same end user device 100.

The server 104 is reachable via one or more computer networks, private and/or public. The server 104 may be deployed within an enterprise network, or on the public Internet.

The sequence shown in FIG. 1A typically begins after it is determined that it is necessary or desirable to transfer data elements 105 from the first program 101 to the second program 102, so 102 that the second program can thereafter store and access them. Typically, the first and second programs 101, 102 are paired prior to data transfer to ensure they are in fact executing on the same end user device. This guards against man-in-the-middle (MITM) attacks; the pairing operation is described later with respect to FIG. 2. Also, later in this document and with respect to FIG. 3, an example will be provided that relates to an enterprise access and resource delivery system.

At the start of the data transfer process shown in FIG. 1A, the first program 101 is instructed to connect to the server 104. Such instruction may be given by any authority wishing to propagate authenticated information through the first program to the second. Alternatively, the first program 101 may have native coding that independently triggers the operation.

The first program 101 establishes a secure transport connection to a specified hostname (e.g., referred to herein as 'data-vac.akamai.com') or specified IP address. A typical connection would be secured by transport layer security (TLS) over a transport control protocol (TCP) connection, although these are merely contemporary examples. It should be noted that in the TLS handshake, standard public key infrastructure (PKI) can be used: the server's certificate can be signed by a public certificate authority already trusted by the first program certificate store. Using the connection, the first program 101 sends the collected and/or generated data elements 105 to the server 104. Continuing the TLS over TCP example, the data elements 105 will be encrypted in accord with the TLS protocol such that only endpoints 101 and 104 have access to the TLS keys for decryption. This step is indicated as '1A-1' in FIG. 1A.

While TLS and standard PKI certificates are being used above as examples, the first program 101 and server 104 can use any trust model, including any mutually-understood authentication and encryption scheme and more generally any mutually-agreed trust model. The trust model is maintained exclusively between the first program 101 and server 104 without weakening the posture by allowing the second program 102 to have visibility. Further, the teachings hereof do not depend on the use of any specific protocol for communicating at the application layer between the first program 101 and the server machine 104 (i.e., inner communication channel in FIG. 1A). The data elements 105 could be sent in a HTTP message (including 1.x and H2 or any other version), or in a QUIC message, or any other format which the server 104 can read.

The second program 102 is configured to intercept the connection created at 1A-1. Interception can be based on any information the second program has directly, or can gain indirectly, with respect to the connection from the first program 101 to the server 104. The most obvious of these data are the target hostname or destination IP address. Note that the second program 102 cannot terminate the TLS layer, so it cannot read the data elements 105, as they are encrypted between the two endpoints 101 and 104 and the second program 102 does not have necessary TLS keys.

The second program 102 encapsulates the data elements 105 (and indeed, preferably the entire connection data stream) using an encapsulating protocol, as indicated by the arrow 1A-2 in FIG. 1A. The encrypted data elements 105 are tunneled to the server 104 using this messaging protocol.

The teachings hereof do not depend on the use of any specific encapsulating protocol. A suitable protocol provides a messaging format that has one or more control fields (sometimes referred to as header fields, equivalently for purposes hereof) and one or more payload fields. The control fields identify the software program 102 and have other information, and the payload field(s) will carry the encrypted data elements 105. Protocols such as GRE, Web-Socket, and IPSec can be used as a base, with the payload carrying both encrypted data elements 105 and control elements within embedded framing. These are merely examples. Any protocol can be used, even if somewhat inefficient (such as using HTTP/S for both the encapsulating protocol and inner protocol).

The server 104 receives the data elements 105 encapsulated in the payload of the encapsulating protocol. The server 104 removes the encapsulation, extracting the data elements 105, which are encrypted in the TLS record layer. The server 104 decrypts the data elements 105. It then sends the data elements 105 back to the second program 102 with the previous encryption removed, and otherwise in accord with the encapsulating protocol of the outer channel (see 1A-3 in FIG. 1A). This typically involves re-encrypting the data element 105 in accord with the encryption scheme between the server 104 and the second program 102. While not limiting, the server 104 can place the data elements 105 into one or more control fields of the encapsulation protocol in order to send it back to the second program 102 (indicated by 1A-3 in FIG. 1A). The server 104 can include a response message (e.g., with a user message for example confirming the transfer) to the first program 101 in the payload field, which the second program 102 relays to the first program 101. The second program 102 can now store the data elements 105 for use going forward.

As shown by the different color 'lock' icon in FIG. 1A, when the server 104 sends the data elements 105 back to the second program 102 in the control field(s), the server 104 can encrypt them using a different encryption key and/or encryption protocol, one that the second program 102 can read. The implementation of the teachings hereof do not depend on the use of any particular encryption protocol.

Figure 1B:
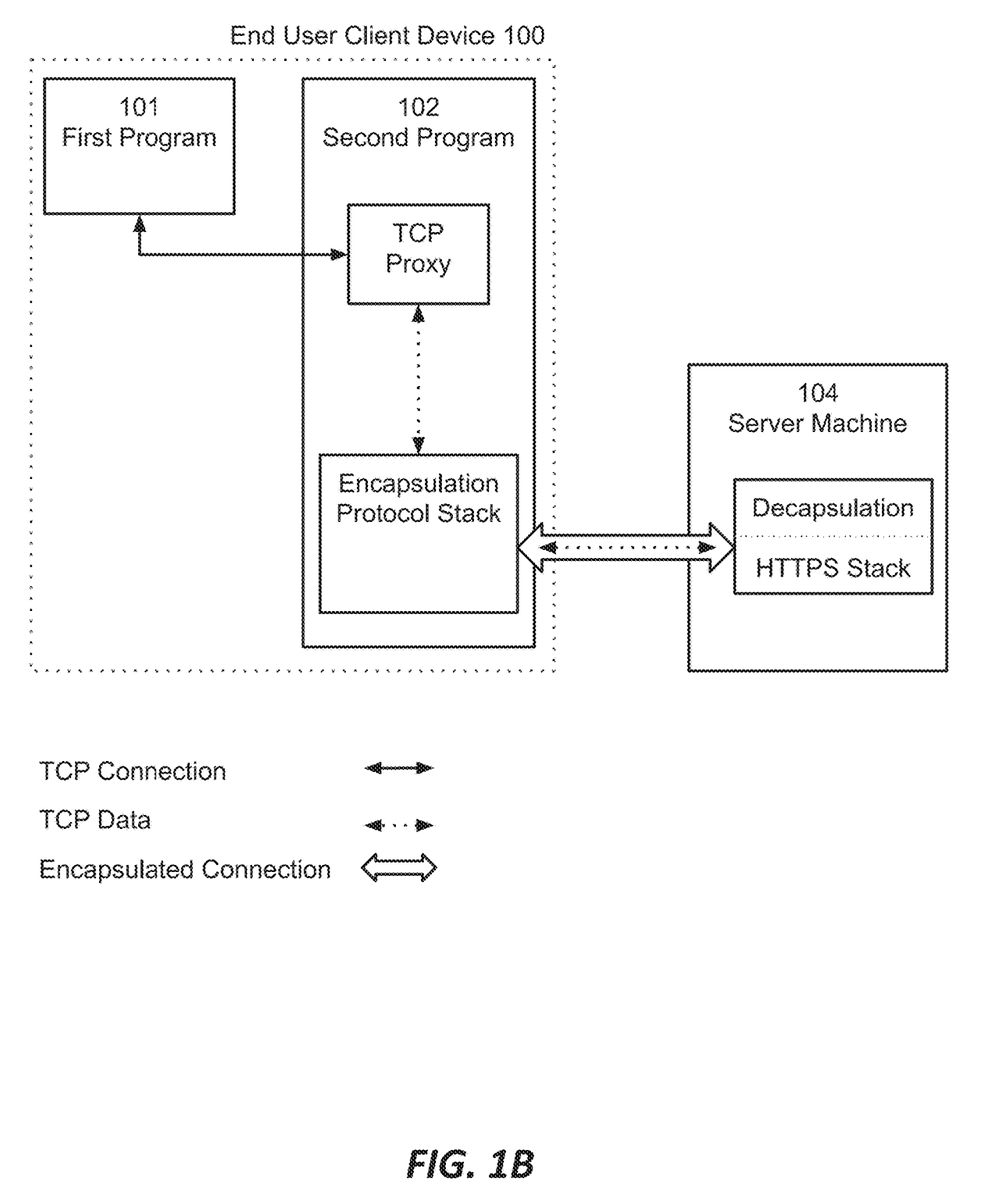
FIG. 1B is a diagram illustrating optional technical protocols and other details that can be used to implement the process shown in FIG. 1A.

FIG. 1B is an alternate view of the components involved in the data transfer process just shown and described with respect to FIG. 1A, at least in one possible implementation. The end user client device 100 hosts both the first and second programs 101, 102. When the first program 101 connects to the server 104, the second program intercepts this connection and terminates the TCP layer at a TCP proxy. The TCP data (including the data elements 105 in FIG. 1A, which could be, for example, encrypted in TLS records from the first program 101) are sent to the encapsulation protocol stack, which wraps the data and tunnels it to the server machine 104 using the encapsulation protocol. On the server side 104, there is a decapsulation module coupled to the HTTPS stack. In this combined component, the encapsulation is removed and both information from the encapsulation messages and the TCP data (from program 101) are exposed to the HTTP stack. It is here that the original TLS session from the first program 101 is terminated, so that the data elements 105 from the first program can be decrypted (though using TLS for encryption is not necessary, but just an example).

Figure 2:
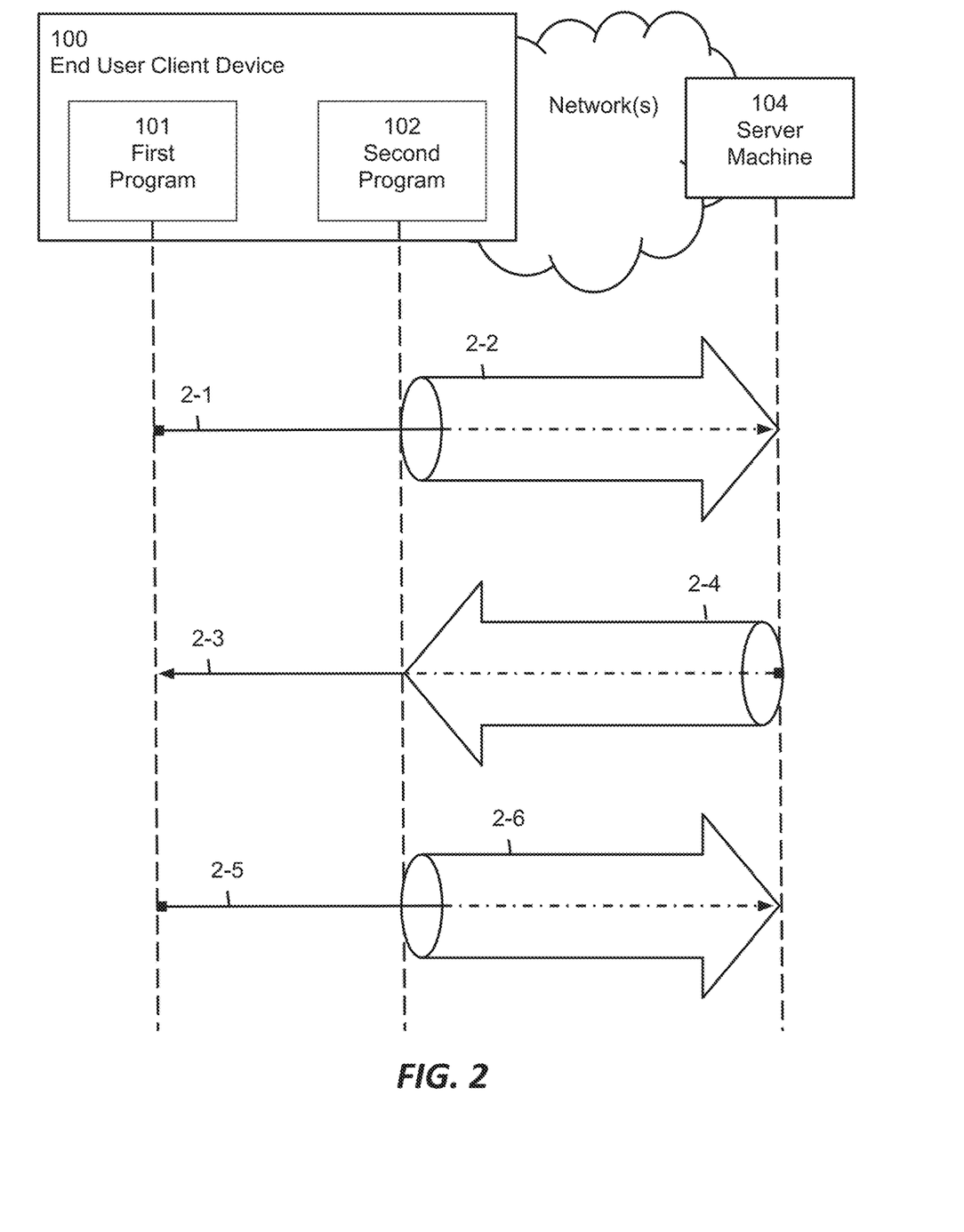
FIG. 2 is a diagram illustrating a pairing process between the first and second programs shown in FIG. 1A, in accord with one embodiment of the teachings hereof.

FIG. 2 illustrates the process of pairing two programs to ensure that they reside on the same end user device 100. Typically the process shown in FIG. 2 would occur before the data transfer operation shown in FIG. 1A. When the first program 101 first sends an initial message (2-1) to the server 104, it will not contain a pairing identifier. (This message might be, for example, an initial 'hello' message from the first program 101 prior to the data transfer process in FIG. 1A, or the message sending the data elements 105.) The second program's message 2-2 will also lack a pairing identifier. Alternatively, the pairing identifiers may be present, but not equal and therefore invalid. The server 104 recognizes this and takes several steps to effectuate pairing. First, the server 104 responds by instructing the second program (shown at 2-3 in FIG. 2) to cause the device on which it is executing to produce a user-perceptible signal. The user-perceptible signal can be a visual display (alphanumeric code, image, etc.), audio (voice code, etc.), or otherwise. Contemporaneously, the server 104 instructs the first program 101 (at 2-4 in FIG. 2) to ask the end-user to enter the signal's content, thereby confirming the signal (e.g., via a web page that the server 104 serves for this purpose). The server 104 must then confirm that the signals match, and that the first program 101 is sending the signal as a result of the server 104's directly asking it too (e.g., the web page it served), as opposed to sending it as a relay from some other party. This might be through a REFERER check in HTTPS, for example. If these conditions are satisfied, this is proof to the server 104 that the two programs 101, 102, are running on the same end-user device 100. Consequently the server 104 generates a pairing identifier (using known techniques to generate a secure token) and issues it to the first and second programs 101, 102. (Or, the server generates a pair of associated identifiers and issues one to each program.)

From this point forward the data transfer process shown in FIG. 1A can proceed.

Note that in practice, the processes of FIGS. 1A and 2 can be combined. That is, the first program 101 can send the data elements 105 in a message, which the second program 102 encapsulates and sends to the server 104, as in FIG. 1A. However, the server 104 temporarily refrains from reflecting the data elements 105 back to the second program 102 at 1A-3 in FIG. 1A. Instead, the pairing process is performed (specifically, parts 2-3, 2-4, 2-5, 2-6 of FIG. 2, since the hello message at 2-1 and 2-2 in FIG. 2 has been taken care of by the sending of the data elements 105 in 1A-1, 1A-2). If and when successful pairing occurs, the server 104 can then forward the data elements 105 to the second program 102, as shown in the last step of FIG. 1A (at 1A-3).

Figure 3:
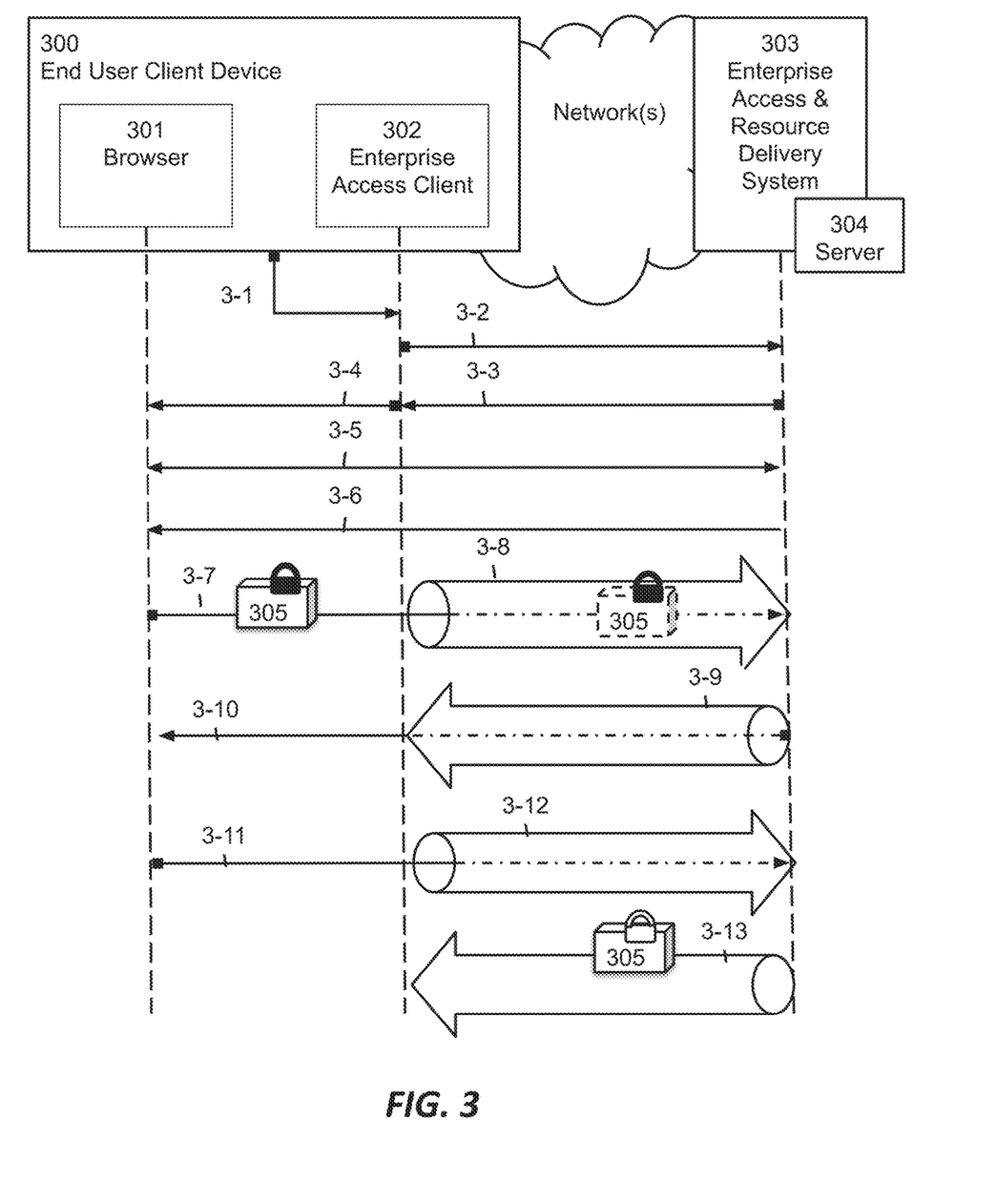
FIG. 3 is a diagram illustrating a data transfer process between a browser and an enterprise access client in the context of an enterprise resource access system, in accord with one embodiment of the teachings hereof; and, FIG. 4 is a block diagram illustrating hardware in a computer system that may be used to implement the teachings hereof.

FIG. 3 illustrates an embodiment of the invention used to transfer authenticators 305 between a browser 301 and an enterprise access client program 302. The server 104 described previously for facilitating the data transfer processes is shown as server 304 within the enterprise access and resource delivery system 303.

Enterprise Access Client 302 (or simply 'access client' 302) is a program running on end-user device 300 that facilitates end-user access to enterprise resources that reside behind an enterprise firewall. To this end, the access client 302 is capable of intercepting outbound connections for web resources (e.g., HTTP messages from browser 301) to domains associated with enterprise resources, and onboarding such connections to an enterprise access and resource delivery system 303 (or simply 'enterprise access system' 303). The access client 302 provides a similar service for non-HTTP enterprise resources, such as ssh, vnc, email clients, and the like. This enterprise access system 300 can be implemented as an overlay network that carries them to a gateway node that provides a tunnel into the enterprise network. The enterprise data center connects to this gateway node by dialing out to it through the enterprise firewall and maintaining persistent connections to it.

In general, access client 302 enforces policy by querying a policy endpoint in the enterprise access system 303 for authorization and other policy decisions. The policy is typically defined by the enterprise. To do this, the access client 302 must be able to present authenticators for the end user and/or end-user device 300. FIG. 3 shows the process of obtaining such authenticators via a web-based workflow with browser 301 and then the process of transferring these data elements 305 to the access client 302. Note that any type or amount of data available at the browser 301 can be transferred likewise.

In one embodiment, the process proceeds as follows. At 3-1, an end user attempts to make a connection to a resource which the access client 302 is configured to intercept (e.g., by domain name or destination IP address inspection). The connection attempt may be outbound from any program on the device 300, even those that do not use HTTP.

The access client 302 intercepts this communication and makes a RESTful request (3-2) to a policy enforcement endpoint within the enterprise access system 303 for an authorization token. Part of that request includes sending authenticators that it has collected so far. If there aren't sufficient authenticators to make an authorization decision, the policy endpoint instructs (at 3-3) the access client 302 to open browser 301 in order to collect the missing authenticators through rich web based flows using HTTP.

At 3-4, the access client 302, upon receiving this signal, opens the default system web browser (browser 301), directing it back to the policy endpoint (or another endpoint designated for this purpose) with a web workflow (shown as 3-5) that requests the user and/or device 300 to provide the missing authenticators. Authenticators may comprise any conventional item, such as username/password, certificate, certificates, secure tokens generated for the session from any of the foregoing, etc. The authentication process may use any conventional technique, including SAML and OAUTH and any other identity provider protocol; the teachings hereof do not require the use of any one particular such technique. Any number and type of additional authenticators (e.g., tokens) may be generated from the primary information collected by the enterprise access system 303 or browser 301.

Once the policy endpoint of the enterprise access system 303 has enough authenticators through the given set of browser 301 interactions, e.g., such that it can make an authorization decision, it will want to bind those authenticators to the end user's access client 302 for future use, lest the browser 301 be opened up for every subsequent connection. Binding the authenticators to the access client 302 also enables the access client 302 to use such authenticators in handling non-HTTP services (e.g., ssh, vnc, email clients, as previously mentioned).

The authenticator binding process works as follows. Once the policy endpoint has determined the necessary authenticators are now present, it instructs, at 3-6, the browser 301 to go to the server 304, which will effect the data transfer. It can do this by instructing the browser to go to a domain, e.g., 'data-vac.akamai.com' with the authenticators. This policy endpoint 'instruction' could be, but is not limited to, standard RFC2616 HTTP Redirects with the authenticators embedded as GET fields, a JavaScript driven POST with hidden variables containing the authenticators (known in the art as a POST bind), or a webpage with the authenticators embedded as hidden variables with the form's target being the server 304 and a submission button.

The policy endpoint instruction causes the browser 302 to issue an HTTP GET or POST, as outlined above, containing all relevant information, encrypted in the TLS record layer. This is shown at 3-7 in FIG. 3, the encrypted data is shown by 305. Note that the policy endpoint may encrypt the authenticators even before giving them to the browser 301. (There are several possible data access permission types for the first and second programs 101, 102; they are described later in this document.)

The access client 302 on the device 300 is set up to intercept communication with data-vac.akamai.com, and thus the HTTP transaction is encapsulated by the access client 302 inside of the encapsulating protocol, in the manner described in connection with FIG. 1A. This step is shown as 3-8 in FIG. 3. The server 304 at data-vac-akamai.com, upon getting the encapsulated request, decapsulates the outer layer and then terminates the inner TLS-secured connection with the browser 301.

If the browser 301 and access client 302 were already paired, then the server 304 immediately takes the given authenticators (which are data elements 305), places them into a control field in accord with the encapsulating protocol, and delivers them back to the access client 302 as the outer part of the tunnel.

Assuming the browser 301 and access client 302 are not paired, however, the server 304 initiates the pairing process. In FIG. 3 this process occurs at 3-9, 3-10, 3-11, 3-12. At 3-9, the server 304 is instructing the access client 302 to display the user perceptible signal, at 3-10, the server 304 is instructing the browser 301 to present a web page that will solicit end-user input as to the user-perceptible signal. Confirmation of that signal is returned to the server 304 at 3-11 and 3-12, and assuming a match, the two programs 301, 302 are paired. The pairing can be enforced by setting a cookie in the browser 301 under the data-vac.akamai.com domain with a pseudorandom secret and an identifier for the end-user device 300. For security the cookie can be encrypted, however this is not necessary; the pseudorandom secret essentially provides a large number with a suitably low probability of being guessed. A matching token can be placed on the access client 302. At this point, the server 304 can proceed to take the given authenticators 305, place them into a control field in accord with the encapsulating protocol, and deliver them back to the access client 302 in the outer part of its tunnel as shown at 3-13 in FIG. 3.

The access client 302, now seeded with the necessary authenticators 305, can retry the request for the authorization token to the policy endpoint of the enterprise access system 303. In an alternate embodiment, the web based workflow shown at 3-5 can be used to produce not only authenticators but an authorization decision from the policy endpoint, and that decision is encoded into an authorization token and included in the package of data elements 305 that is transferred from browser 301 to access client 302 in FIG. 3. Doing so avoids the need for the access client 302 to retry the authorization request.

Data Access Permissions

The embodiments described above have focused on data elements 105 (or authenticators 305) being encrypted in transit (for example, in the inner communication channel 1A-1 and outer communication channel 1A-3). Further, the second program 102 has access to the data elements 105, 305, when the data elements are at rest, i.e., after being received via the outer communication channel from the server 104, 304. It should be understood that there are several different options for defining program access to the data elements 105, 305 when at rest in the first/second programs. Generalizing, each of the first and second programs 101, 102 can have any of following access types to the data:

a) No access. A program has no ability to decrypt nor change the data. This implies it has neither the decryption key nor the signer key.

b) Read only. A program has the ability to decrypt but not change the data. This implies it has the decryption key but not the signer key.

c) Read and write access. A program has the ability to decrypt and/or change the data. This implies it has both the decryption key and the signer key.

d) Write only. A program has no ability to decrypt, but can change the data. This implies it has no decryption key but does have the signer key. This use case merely allows the program to change a blob of data it can't understand, so it is of relatively limited value.

All of the above access types, for each of the first and second programs, are compatible with the teachings hereof. Here are some use-cases for various combinations of access types:

e) In the FIG. 3 example, the authenticators could be encrypted by the system 303 such that their contents can be deciphered by the access client 302, with the first program (browser 301) having no way to unlock them but rather acting as a delivery channel to get them to the second program (access client 302).

f) The authenticators could be encrypted by the system 303 such that their contents can be deciphered by both the first and second programs (browser 301, access client 302).
g) The authenticators could be encrypted by the system 303 such that their contents cannot be deciphered by either of the first and second programs (301, 302). In this scenario, the data is opaque to the programs 301, and 302, and while they are aware that the data is present they do not know its contents.
h) Finally, the authenticators could be encrypted by the system 303 such that their contents can be deciphered by the first program (browser 301), with the second program (access client 302) having no way to unlock them but rather acting as a receiver for the data (potentially storing and later returning it to the system 303). This scenario is also applicable in the "reverse" case where the techniques being described here are used to transfer data from the second 302 to the first program 301.

Alternative Embodiments

The entirety of the above description is provided by way of example only. Those skilled in the art will appreciate variations that are within the scope of the teachings hereof. For example, the data transfer process can be run in reverse, that is, with the second program 102 having certain data elements 105' in FIG. 1 sending those data elements 105' to the first program 101. To accomplish this use case, the second program 102 sends data elements 105' in the control or payload fields of the encapsulating protocol, and the server 104 reflects it back to the first program 101 via the inner part of the tunnel, the connection from server 104 to first program 101.

This "reversed" data transfer operation can be initiated by the first program 101 making a request for such data elements 105' to the 'data-vac.akamai.com' server 104. For example if the first program 101 is a browser it can be redirected by a policy endpoint in the system 303 to cause the browser to make an HTTP GET request to the server 104 for a designated resource, which resource the server 104 recognizes as one or more data elements 105' available from the second program 102.

In sum, the teachings hereof can be used to create bidirectional data transfers between co-located programs. To illustrate how this might be used, consider that a browser may need to display some information (e.g., in a rich, dynamic presentation) about a software module running on the same machine. An example is as an antivirus module issuing version status/report to the end-user on a website that the user will access through the browser. Instead of the traditional approach—having the antivirus module report the information to a central cloud database that a web server queries—the browser can securely ask the local antivirus software agent about the information. The same approach can be adopted for device posture like agents in re: browser interaction.

In yet another embodiment, the teachings hereof can be implemented using a connectionless approach. For example, the first program 101 can send encrypted data elements 105 to the server 104 in UDP packets, which the second program 102 encapsulates and sends to the server 104. (The encryption keys can be set up out of band in this embodiment.) The server 104 sends the decrypted data elements 105 back to the second program 102 in the manner already described. In this embodiment, the pairing tokens for the first and second programs 101, 102 should be included in every message, since the connection is not present to provide that guarantee. If attaching pairing tokens in every message is undesirable, then one can prove pairing by establishing session layers over the UDP channel (using DTLS for example), and utilizing said session layers to transmit the pairing tokens once, establishing a binding between the session layers and the pairing tokens themselves. After that operation, the pairing tokens can be omitted as the ownership (and successful use) of the DTLS keys provides the proof of pairing.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 4:
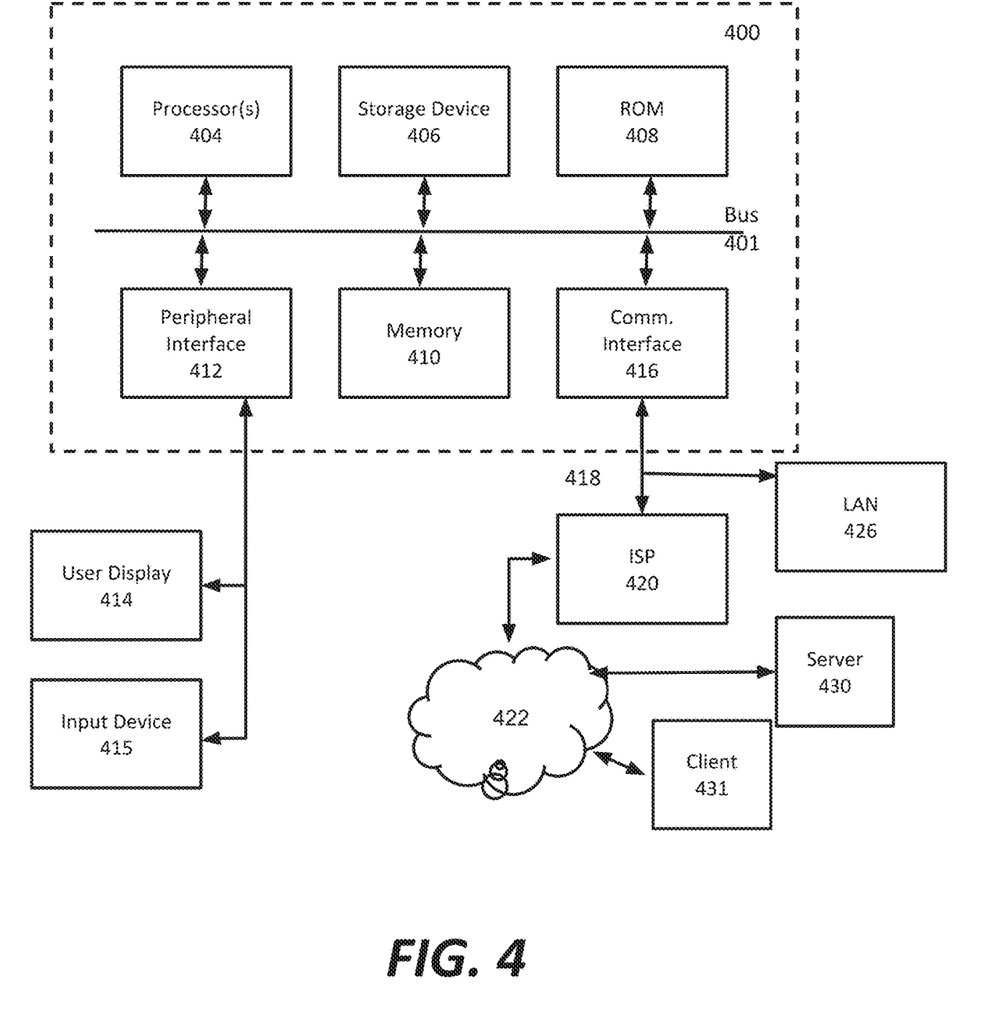

FIG. 4 is a block diagram that illustrates hardware in a computer system 400 upon which such software may run in order to implement embodiments of the invention. The computer system 400 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 400 includes a microprocessor 404 coupled to bus 401. In some systems, multiple processor and/or processor cores may be employed. Computer system 400 further includes a main memory 410, such as a random access memory (RAM) or other storage device, coupled to the bus 401 for storing information and instructions to be executed by processor 404. A read only memory (ROM) 408 is coupled to the bus 401 for storing information and instructions for processor 404. A non-volatile storage device 406, such as a magnetic disk, solid state memory (e.g., flash memory), or optical disk, is provided and coupled to bus 401 for storing information and instructions. Other application-specific integrated circuits (ASICs), field programmable gate arrays (FPGAs) or circuitry may be included in the computer system 400 to perform functions described herein.

A peripheral interface 412 may be provided to communicatively couple computer system 400 to a user display 414 that displays the output of software executing on the computer system, and an input device 415 (e.g., a keyboard, mouse, trackpad, touchscreen) that communicates user input and instructions to the computer system 400. However, in many embodiments, a computer system 400 may not have a user interface beyond a network port, e.g., in the case of a server in a rack. The peripheral interface 412 may include interface circuitry, control and/or level-shifting logic for local buses such as RS-485, Universal Serial Bus (USB), IEEE 1394, or other communication links.

Computer system 400 is coupled to a communication interface 416 that provides a link (e.g., at a physical layer, data link layer) between the system bus 401 and an external communication link. The communication interface 416 provides a network link 418. The communication interface 416 may represent an Ethernet or other network interface card (NIC), a wireless interface, modem, an optical interface, or other kind of input/output interface.

Network link 418 provides data communication through one or more networks to other devices. Such devices include other computer systems that are part of a local area network (LAN) 426. Furthermore, the network link 418 provides a link, via an internet service provider (ISP) 420, to the Internet 422. In turn, the Internet 422 may provide a link to other computing systems such as a remote server 430 and/or a remote client 431. Network link 418 and such networks may transmit data using packet-switched, circuit-switched, or other data-transmission approaches.

In operation, the computer system 400 may implement the functionality described herein as a result of the processor executing code. Such code may be read from or stored on a non-transitory computer-readable medium, such as memory 410, ROM 408, or storage device 406. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 418 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A system for securely transferring data between two software programs executing on the same end-user device, the system comprising:
   a first program that executes on an end-user device to:
      send one or more encrypted data elements towards a server machine over one or more computer networks;
   a second program that executes on the end-user device to:
      intercept the one or more encrypted data elements before they leave the end-user device, with the one or more encrypted data elements remaining opaque to the second program,
      encapsulate the one or more encrypted data elements using an encapsulating protocol that has one or more control fields and one or more payload fields, and,
      send the encapsulated one or more encrypted data elements to the server machine in the one or more payload fields;
   the server machine configured with software to:
      receive the encapsulated one or more encrypted data elements,
      extract the one or more encrypted data elements from the one or more payload fields,
      decrypt the one or more encrypted data elements to generate one or more data elements, and,
      after said decryption, send the one or more data elements back to the second program in the one or more control fields of the encapsulating protocol, so that the second program can read the one or more data elements.

2. The system of claim 1, wherein the first program executes to establish a TCP connection to the software on the server machine, and to use TLS to encrypt the one or more encrypted data elements and send them over the TCP connection.

3. The system of claim 2, wherein the second program intercepts the TCP connection.

4. The system of claim 1, wherein the first program comprises a web browser.

5. The system of claim 1, wherein the second program comprises an access client for providing secure access to one or more enterprise resources over the public Internet.

6. The system of claim 1, wherein the one or more data elements comprise any of:
   session state, one or more authenticators, one or more authorization tokens.

7. The system of claim 1, wherein the second program selectively intercepts the one or more encrypted data elements based on at least one of: destination domain name or destination IP address.

8. The system of claim 1, wherein the software of the server machine is configured to execute a pairing operation, at least prior to the server machine sending of the one or more data elements back to the second program, the pairing operation being performed to establish that the first and second programs are on the same end-user device.

9. The system of claim 8, wherein the pairing operation comprises:
   the server machine sending an instruction to the second program to provide a signal to an end-user via an end-user interface of the end-user device, and prompting the end-user to report said signal to the first program, so that the first program can transmit the reported signal back to the server machine for verification.

10. The system of claim 9, wherein the signal is any of a visual and audio code.

11. A system for securely transferring data between two software programs executing on the same end-user device, the system comprising:
   a first program that executes on an end-user device to:
      establish a first communication channel to a server machine over one or more computer networks;
   a second program that executes on the end-user device to:

intercept the first communication channel before it leaves the end-user device, with messages in the first communication channel remaining opaque to the second program, encapsulate the first communication channel using an encapsulating protocol that has one or more control fields and one or more payload fields, send the encapsulated first communication channel to the server machine in the one or more payload fields, and, send one or more data elements to the server machine via the encapsulating protocol;

the server machine configured with software to:

receive the one or more data elements from the second program via the encapsulating protocol, and, send the one or more data elements back to the first program using the encapsulated first communication channel, in an encrypted form so that the second program cannot read the one or more data elements but the first program can.

12. A method for securely transferring data between two software programs executing on the same end-user device, the method comprising:

with a first program executing on an end-user device:

sending one or more encrypted data elements towards a server machine over one or more computer networks;

with a second program executing on the end-user device:

intercepting the one or more encrypted data elements before they leave the end-user device, with the one or more encrypted data elements remaining opaque to the second program, encapsulating the one or more encrypted data elements using an encapsulating protocol that has one or more control fields and one or more payload fields, and, sending the encapsulated one or more encrypted data elements to the server machine in the one or more payload fields;

with the server machine:

receiving the encapsulated one or more encrypted data elements, extracting the one or more encrypted data elements from the one or more payload fields, decrypting the one or more encrypted data elements to generate one or more data elements, and, after said decryption, sending the one or more data elements back to the second program in the one or more control fields of the encapsulating protocol, so that the second program can read the one or more data elements.

13. The method of claim 12, wherein the first program executes to establish a TCP connection to the software on the server machine, and to use TLS to encrypt the one or more encrypted data elements and send them over the TCP connection.

14. The method of claim 12, wherein the first program comprises a web browser.

15. The method of claim 12, wherein the second program comprises an access client for providing secure access to one or more enterprise resources over the public Internet.

16. The method of claim 12, wherein the one or more data elements comprise any of: session state, one or more authenticators, one or more authorization tokens.

17. The method of claim 12, wherein the second program selectively intercepts the one or more encrypted data elements based on at least one of: destination domain name or destination IP address.

18. The method of claim 12, wherein the server machine executes a pairing operation, at least prior to the server machine sending of the one or more data elements back to the second program, the pairing operation being performed to establish that the first and second programs are on the same end-user device.

19. The method of claim 18, wherein the pairing operation comprises:

the server machine sending an instruction to the second program to provide a signal to an end-user via an end-user interface of the end-user device, and prompting the end-user to report said signal to the first program, so that the first program can transmit the reported signal back to the server machine for verification.

20. A method for securely transferring data between two software programs executing on the same end-user device, the method comprising:

with a first program executing on an end-user device:

establishing a first communication channel to a server machine over one or more computer networks;

with a second program executing on the end-user device:

intercepting the first communication channel before it leaves the end-user device, with messages in the first communication channel remaining opaque to the second program, encapsulating the first communication channel using an encapsulating protocol that has one or more control fields and one or more payload fields, sending the encapsulated first communication channel to the server machine in the one or more payload fields, and, sending one or more data elements to the server machine via the encapsulating protocol;

with the server machine:

receiving the one or more data elements from the second program via the encapsulating protocol, and, sending the one or more data elements back to the first program using the encapsulated first communication channel, in an encrypted form so that the second program cannot read the one or more data elements but the first program can.

* * * * *